(12) United States Patent
Singh

(10) Patent No.: US 9,953,072 B2
(45) Date of Patent: Apr. 24, 2018

(54) DISASTER RECOVERY OF MOBILE DATA CENTER VIA LOCATION-AWARE CLOUD CACHING

(71) Applicant: VMWARE, INC., Palo Alto, CA (US)

(72) Inventor: Rajesh Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 531 days.

(21) Appl. No.: 14/633,165

(22) Filed: Feb. 27, 2015

(65) Prior Publication Data

US 2016/0188689 A1 Jun. 30, 2016

(30) Foreign Application Priority Data

Dec. 31, 2014 (IN) .................... 6847/2014

(51) Int. Cl.
| | |
|---|---|
| *G06F 17/00* | (2006.01) |
| *G06F 17/30* | (2006.01) |
| *H04L 29/08* | (2006.01) |
| *H04W 4/02* | (2018.01) |
| *H04L 12/861* | (2013.01) |
| *H04W 88/08* | (2009.01) |

(52) U.S. Cl.
CPC .... *G06F 17/30575* (2013.01); *H04L 67/1095* (2013.01); *H04W 4/02* (2013.01); *H04L 49/9047* (2013.01); *H04W 88/08* (2013.01)

(58) Field of Classification Search
CPC .............. G06F 17/30; G06F 17/30575; G06F 17/30371; G06F 17/00
USPC .................................................. 707/600–899
See application file for complete search history.

(56) References Cited

U.S. PATENT DOCUMENTS 8,719,362 B2 * 5/2014 Wu ....................... G06F 3/0605
709/203

\* cited by examiner

*Primary Examiner* — Isaac M Woo

(57) ABSTRACT

A method for copying first data stored at a primary data center to a secondary data center is provided. The method includes initiating a first replication task to copy the first data from the primary data center to the secondary data center. The method also includes receiving a first portion of the first data from the primary data center via a first access point, wherein a first bandwidth between the primary data center and the first access point is greater than a second bandwidth between the primary data center and the secondary data center. The method further includes storing the first portion of data in a first cache associated with the first access point. The method also includes transmitting the first portion of data from the first cache to the secondary data center. A system and non-transitory computer-readable medium are also provided.

20 Claims, 4 Drawing Sheets

DISASTER RECOVERY OF MOBILE DATA CENTER VIA LOCATION-AWARE CLOUD CACHING

RELATED APPLICATIONS

Benefit is claimed under 35 U.S.C. 119(a)-(d) to Foreign application Serial No. 6847/CHE/2014 filed in India entitled "DISASTER RECOVERY OF MOBILE DATA CENTER VIA LOCATION-AWARE CLOUD CACHING", on Dec. 31, 2014, by VMware, Inc., which is herein incorporated in its entirety by reference for all purposes.

BACKGROUND

Storage replication is a data protection strategy in which data objects (e.g., files, physical volumes, logical volumes, file systems etc.) are replicated to provide some measure of redundancy. Storage replication may be used for many purposes, such as ensuring data availability upon storage failures, site disasters, or planned maintenance. One common use for storage replication is to protect a data center that is in use, by providing a secondary or back-up data center that comes online in the event of a failure at the primary data center. Preferably, storage is replicated as often as desired to minimize the amount of data that would be lost in the event of a failure. However, certain situations may lead to an inability to replicate data as often as desired. For example, data centers that are "mobile" may have connections to the replicating computing network that are of a nature such that replication may not be performed as often as desired (for example, connections with low bandwidths, poor quality connections, and the like). Thus, techniques are needed for improving storage replication.

SUMMARY

A method for copying first data stored at a primary data center to a secondary data center is provided. The method includes initiating a first replication task to copy the first data from the primary data center to the secondary data center. The method also includes receiving a first portion of the first data from the primary data center via a first access point, wherein a first bandwidth between the primary data center and the first access point is greater than a second bandwidth between the primary data center and the secondary data center. The method further includes storing the first portion of data in a first cache associated with the first access point. The method also includes transmitting the first portion of data from the first cache to the secondary data center.

A system for replicating first data is provided. The system includes a first access point configured to initiate a first replication task to copy the first data from a primary data center to a secondary data center. The first access point is also configured to receive a first portion of the first data from the primary data center. The first access point is further configured to store the first portion of data in a first cache associated with the first access point. The first access point is also configured to transmit the first portion of data from the first cache to the secondary data center. A first bandwidth between the primary data center and the first access point is greater than a second bandwidth between the primary data center and the secondary data center.

A non-transitory computer-readable medium storing instructions that, when executed by a processor, cause the processor to execute a method for copying first data stored at a primary data center to a secondary data center is provided. The method includes initiating a first replication task to copy the first data from the primary data center to the secondary data center. The method also includes receiving a first portion of the first data from the primary data center via a first access point, wherein a first bandwidth between the primary data center and the first access point is greater than a second bandwidth between the primary data center and the secondary data center. The method further includes storing the first portion of data in a first cache associated with the first access point. The method also includes transmitting the first portion of data from the first cache to the secondary data center.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
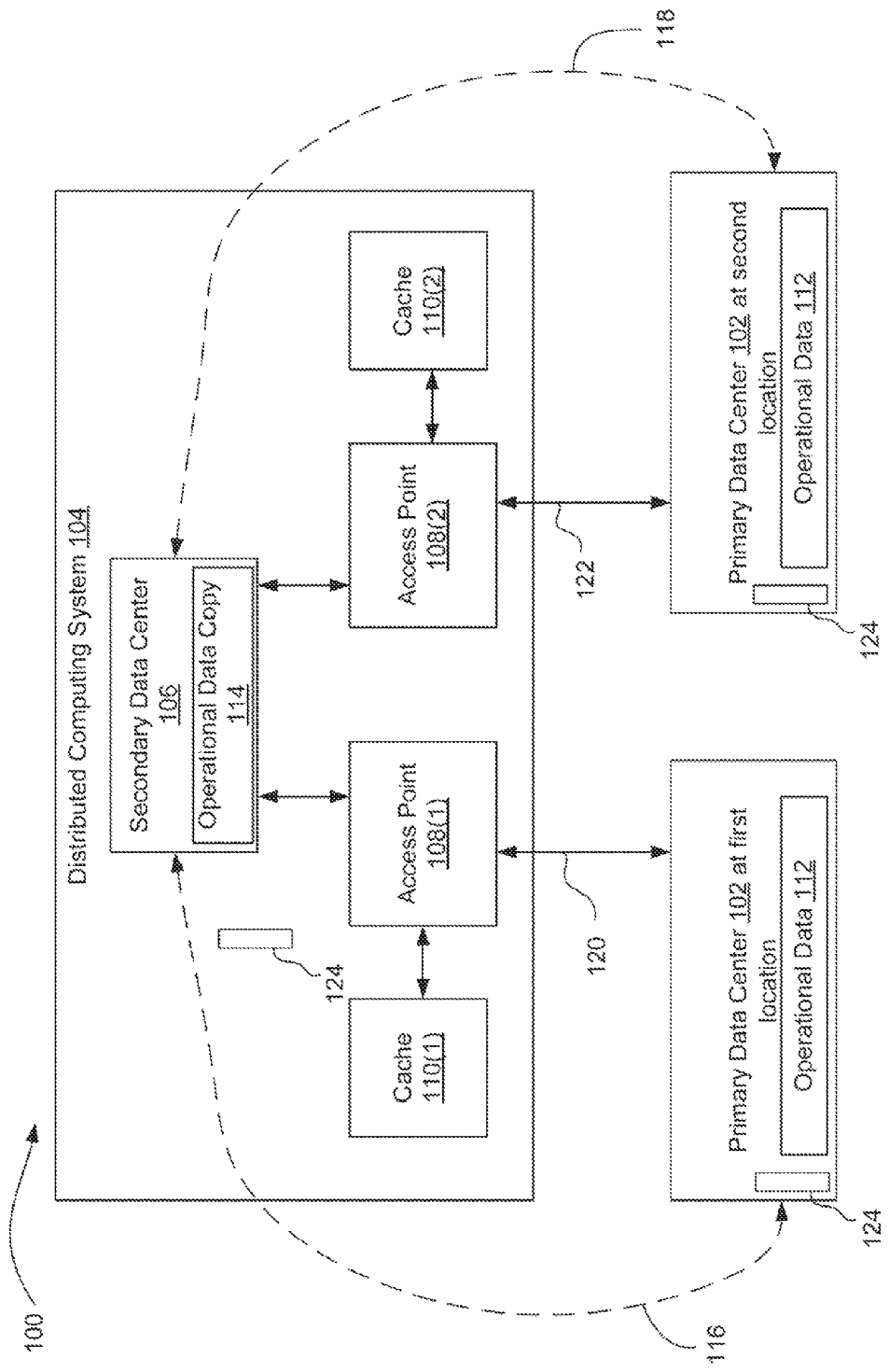
FIG. 1A is a block diagram that illustrates a cloud-based location-aware recovery system, according to an embodiment.

FIG. 1A is a block diagram that illustrates a cloud-based location-aware recovery system 100, according to an embodiment. Recovery system 100 includes a primary data center 102 and a distributed computing system 104. Distributed computing system 104 includes secondary data center 106, one or more access points 108, and one or more caches 110, each associated with a different access point 108.

As described in further detail below, primary data center 102 includes a set of computing resources and associated data for which a duplicate set of computing resources and data are maintained in the event of a system crash or corruption, thereby preventing downtime or even an entire system from being lost due to failure of one or more components. This duplicate set of computing resources may be referred to as "recovery" resources maintained at a secondary data center 106. The process when secondary data center 106 takes over operation in place of primary data center 102, for example, after declaration of a disaster, is referred to as a "failover" or a migration. A failback refers to the converse process of restoring services from secondary data center 106 back to primary data center 102, for example, after the protected site has been restored and is ready to resume operation.

So that secondary data center 106 is able to perform a failover operation, secondary data center 106 maintains a copy 114 of operational data 112 used for operation by primary data center 102. Operational data 112 includes data such as state of hardware and software executing at primary data center 102, and data stored in memories (including caches) and non-volatile storage used for operation of primary data center 102. Secondary data center 106 is generally remote from primary data center 102 with the idea that, when an event causes primary data center 102 to fail, such an event is generally geographically local to primary data center 102 and thus does not affect secondary data center 106.

Primary data center 102 copies the operational data 112 to the secondary data center 106 in a "replication task." Initially, when the secondary data center 106 is first operated and does not contain any copied operational data 114, primary data center 102 copies substantially all operational data 112 (or some particular chosen subset of operational data 112) to secondary data center 106 in a first replication task. In subsequent replication tasks, primary data center 102 may copy only changes since the previous replication task. A single replication task thus comprises the process of copying either substantially all operational data 112 from primary data center 102 to secondary data center 106 in an "initial" operation, or to the process of copying substantially all changes made since the previous replication task.

Primary data center 102 generally performs replication tasks in an asynchronous manner, in which primary center 102 does not copy data immediately upon that data being generated, but waits for a particular event (a "replication trigger") to happen before transmitting data to secondary data center 106 for replication. This asynchronous replication is in contrast to synchronous replication, in which any data written to primary data center 102 are also written to the recovery site, and I/O acknowledgement is returned to the writer only after receiving acknowledgment from both primary data center 102 and secondary data center 106. Asynchronous replication generally occurs based on a replication trigger such as a schedule or a constraint known as a Recovery Point Objective (RPO) that typically specifies an upper limit on the potential data loss upon a failure or disaster.

Regardless of the particular replication trigger, the rate at which data can be replicated is limited based on the bandwidth between primary data center 102 and secondary data center 106. A limited bandwidth may impose, for example, a hard limit on the number of times operational data 112 may be copied to secondary data center 106 in a particular amount of time, and thus may impose a particular maximum amount of data that may be lost in the event of a failover. Thus, raising this hard limit reduces the amount of data that may be lost in the event of a failover.

A first path 116 between primary data center 102 and secondary data center 106 is associated with a particular bandwidth, meaning that data is transmitted from primary data center 102 to secondary data center 106 at a rate associated with the bandwidth. To improve the bandwidth, and thus the rate at which operational data 112 may be copied to secondary data center 106, primary data center 102 instead copies operational data 112, via access point 108, to cache 110, in a particular replication task. Subsequently, when the replication task is complete, access point 108 copies operational data 112 to secondary data center 106 from cache 110.

Access point 108 generally comprises an electronic device, such as a computing system, that may be coupled, via a link 120, to primary data center 102. Link 120 may be any kind of electronic link that links to primary data center 102, such as computer networking links that may include one or more intermediate devices (relays) as would be used in an internet protocol (IP) network, for example. Additionally, access point 108 is a part of distributed computing system 104, which may, for example, be a cloud system. Access point 108 may include a cloud computing system that is a part of distributed computing system 104 and may be associated with a related cache 110 that is able to store data provided by primary data center 102 and to transmit data to secondary data center 106. Distributed computer system 104 may also include secondary data center 106.

Distributed computer system 104 includes multiple computing systems that may be located at geographically disparate locations (i.e., sites). Thus, an access point 108 may have a particular bandwidth to primary data center 102 while other computer systems within distributed computer system 104, such as secondary data center 106 (if within the distributed computer system 104), have different bandwidths to primary data center 102. If the bandwidth between access point 108 and primary data center 102 is greater than the bandwidth between secondary data center 106 and primary data center 102, then primary data center 102 is able to replicate operational data 112 at a faster rate by copying to access point 108 than by copying directly to secondary data center 106. Thus, when copying to access point 108, the replication trigger can be set more "aggressively." This means, for example, that a replication schedule can be set to replicate operational data 112 more frequently, or that the RPOs can be set more aggressively, meaning that the maximum amount of data to be lost in the event of a failover can be reduced.

Primary data center 102 may be a mobile data center, which means, generally, that primary data center 102 may include computing systems that are within a mobile construct such as a vehicle (land, sea, or air), or the like. Thus, primary data center 102 may change locations during operation. This means that the bandwidth or even ability to connect at all to the access point 108 may be hindered when primary data center 102 changes locations. To accommodate the mobility of primary data center 102, when primary data center 102 changes locations, a location-aware agent 124 identifies that primary data center 102 has changed locations and identifies a new access point 108(2) (different from old access point 108(1)) of distributed computing system 104 to which to copy operational data 112. This newly identified access point 108(2) would have greater bandwidth to primary data center 102 (via link 122) as compared with new direct path 118 between primary data center 102 and secondary data center 106, and preferably would have the highest bandwidth to primary data center 102 out of all access points 108 within distributed computing system 104.

After the access point 108 to which primary data center 102 copies operational data 112 is changed, operational data 112 is copied from the original cache 110(1) to another cache 110(2), the "new" cache 110(2) that is associated with the new access point 108(2) that is now receiving the operational data 112 from primary data center 102.

Once all data for a particular replication task is copied to a particular cache 110, that cache 110 transmits the data to secondary data center 106. While data is being copied to secondary data center 106, primary data center 102 may concurrently copy operational data 112 to a cache 110 associated with the access point 108 to which primary data center 102 is currently copying operational data 112.

Figure 1B:
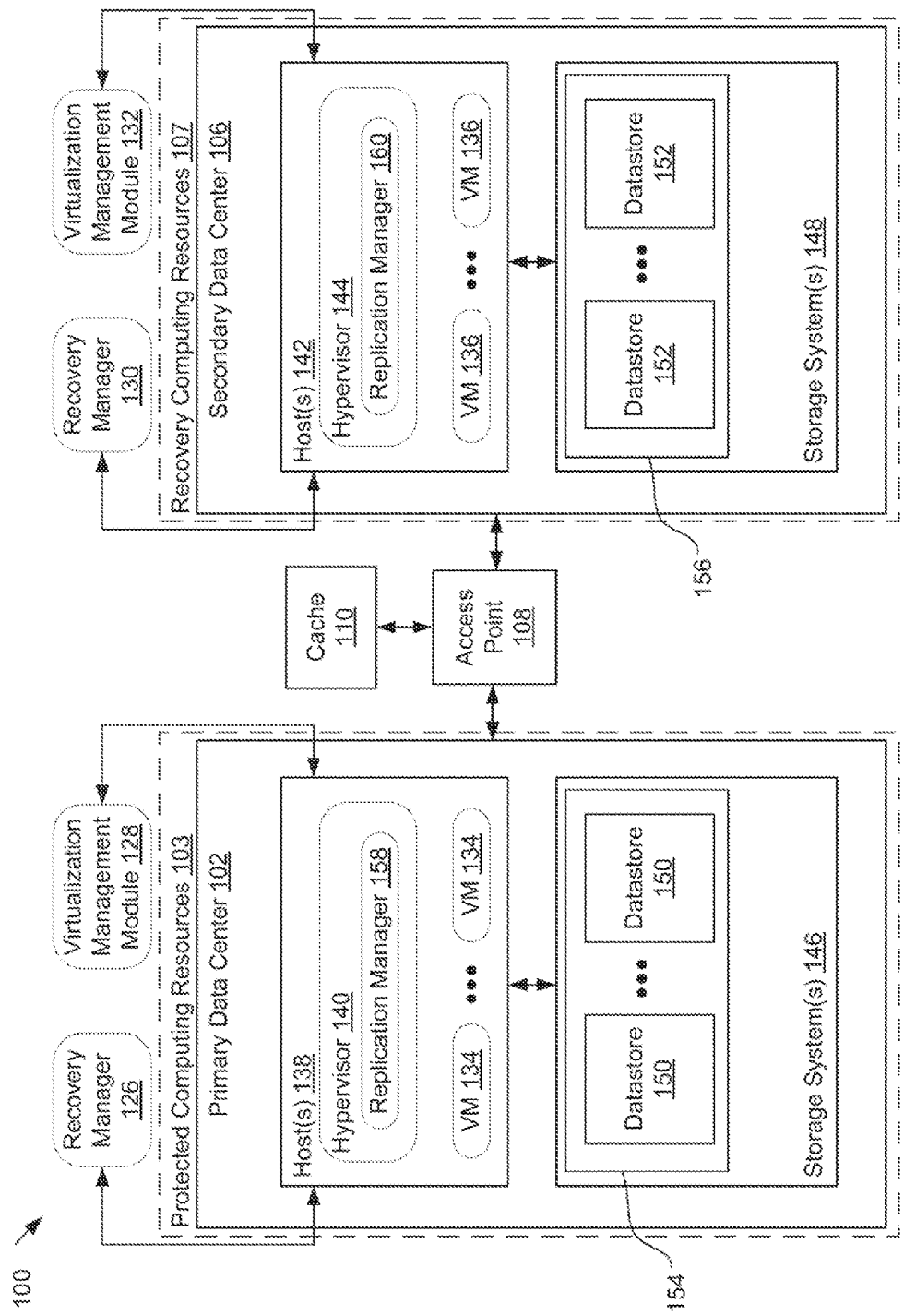
FIG. 1B is a block diagram that illustrates the primary data center and secondary data center in more detail, according to an embodiment.

FIG. 1B is a block diagram that illustrates primary data center 102 and secondary data center 106 in more detail, according to an embodiment. It should be understood that although specific configurations are shown for primary data center 102 and secondary data center 106, various modifications to the configurations are possible and are considered to be within the scope of the present invention. For example, although primary data center 102 and secondary data center 106 are illustrated as computer systems with various virtual machines, hosts, and other components, primary data center 102 and secondary data center 106 may include other or different components and may include no virtual machines executed by hosts. It should be noted that although the primary data center 102 and secondary data center 106 are described as include and executing virtual machines, other "contexts," may instead be included and executed. Such contexts may include containers that do not include a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Additional details regarding OS-less containers are included below.

In one embodiment, primary data center 102 includes protected computing resources 103, a recovery manager 126 and a virtualization management module 128. Similarly, secondary data center 106 includes recovery computing resources 107, a recovery manager 130, and a virtualization management module 132. Computing resources 103, 107 can include computer systems, storage systems, networks and associated devices, and the like. Primary data center 102 may be a datacenter containing protected virtual machines (VMs 134), executing on protected computing resources 103, for which data is being replicated to secondary data center 106.

Protected computing resources 103 include one or more host computers (i.e., host(s) 138) that execute one or more hypervisors 140, which manage virtual machines (VMs) 134 that are protected. Recovery computing resources 107 include one or more host computers (i.e., host(s) 142) that execute one or more hypervisors 144, which manage recovery VMs 136 that will become available after a failover of the corresponding protected VMs 134. Each of hypervisor 140 and 144 can be a "bare-metal" hypervisor, such as vSphere® ESXi™ commercially available from VMware, Inc. of Palo Alto, Calif. Alternatively, one or more of hypervisor(s) 140 and 144 can execute on top of an operating system (OS), which is executing on a host. Hypervisors 140 and 144 provide a software interface layer that abstracts computing hardware resources into virtualized hardware, enabling sharing of the computing hardware resources among virtual machines. Hypervisor 140 acts as an interface between VMs 134 and protected computing resources 103, and hypervisor 144 acts as an interface between VMs 136 and recovery computing resources 107. Hypervisors 140 and 144 may run on top of an operating system or directly on respective computing resources. Although a particular computer architecture is described for protected computing resources 103, other computer architectures may instead or in addition be included as protected computing resources 103 without departing from the scope of the present invention.

VMs 134 and 136 share hardware resources of protected computing resources 103 and recovery computing resources 107, respectively. Each VM typically includes a guest operating system (OS) and virtualized system hardware (not shown) implemented in software to emulate corresponding components of an actual computer system. VMs 134 are part of protected group(s) of VMs, and hence the computing resources shared by VMs 134 are referred to as "protected computing resources." VMs 136 represent VMS which will become available after a failover or disaster recovery, and hence the computing resources shared by VMs 136 are referred to as "recovery computing resources."

Each of host(s) 138 is coupled to one or more storage systems 146, and each of host(s) 142 is coupled to one or more storage systems 148. Storage systems 146, 148 can include one or more mass storage devices, associated networks, and the like. In one embodiment, storage systems 146, 148 may be storage arrays (sometimes referred to as disk arrays), which are storage systems typically containing multiple storage devices (e.g., disk drives), cache memory, and are configured to provide advanced functionality such as RAID, storage virtualization, and array-based replication. Examples of storage arrays include network attached storage (NAS) arrays and storage area network (SAN) arrays. Storage system 146 stores protected datastores 150, and storage system 148 stores recovery datastores 152 corresponding to protected datastores 150. Datastores are logical containers, analogous to file systems, which hide specifics of each storage device and provide a uniform model for storing files that a hypervisor uses to run virtual machines. A datastore can store one or more virtual disks, which store files and data for guest operating systems and applications running in the virtual machines. A datastore can also store VM configuration file(s), file(s) that contain VM snapshot(s), and an other file used by a hypervisor to configure and run VMs. Datastores 150 store files for protected VMs 134, and datastores 152 store files for recovery VMs 136. Datastores 150, 152 are abstracted from the underlying mass storage of storage systems 146, 148. For example, a given datastore can be stored on one or more logical storage devices 154 and 156, respectively, sometimes referred to as logical volumes or logical unit numbers (LUNs), which are, effectively, logical block storage devices exposed by storage system 146, 148. A given logical storage device of a storage system can store multiple datastores, and a datastore can span across multiple logical storage devices.

Recovery system 100 includes a virtualization management module 128 that may communicate with the plurality of hosts 138. In one embodiment, virtualization management module 128 is a computer program that resides and executes in a central server, which may reside in recovery system 100, or alternatively, running as a VM in one of hosts 138. One example of a virtualization management module is the vCenter® Server product made available from VMware, Inc. of Palo Alto, Calif. Virtualization management module 128 is configured to carry out administrative tasks for the recovery system 100, including managing hosts 138, managing VMs running within each host 138, provisioning VMs, migrating VMs from one host to another host, load balancing between hosts 138, creating resource pools comprised of computing resources of hosts 138 and VMs 134, modifying resource pools to allocate and de-allocate VMs and physical resources, and modifying configurations of resource pools. Virtualization management module 132 may be configured similarly.

Recovery manager 126 is configured to coordinate with a corresponding recovery manager 130 to perform disaster recovery operations on protected computing resources (e.g., VMs 134, datastores 150) of primary data center 102 using corresponding recovery computing resources 107 (e.g., VMs 136, datastores 152) of secondary data center 106. In some embodiments, recovery managers 126, 130 may be executing as a virtual machine or on a physical server (not shown). In other embodiments, recovery managers 126, 130 may execute as modules in hypervisors 140, 144. Recovery managers 126, 130 enable a user to plan the availability of virtual workloads in times of a disaster, for example, by enabling the user to recover their virtual workloads quickly when the production datacenter (i.e., primary data center 102) is unavailable. In one embodiment, recovery managers 126, 130 are configured to orchestrate a planned failover of virtual workloads along with the associated storage across primary data center 102 and secondary data center 106, a test failover of virtual workloads along with the associated storage on the secondary data center 106, or unplanned or disaster failover of virtual workloads along with the associated storage across primary data center 102 and secondary data center 106. An example recovery manager that provides disaster recovery is vSphere® vCenter™ Site Recovery Manager™ commercially available from VMware, Inc. of Palo Alto, Calif.

In order to protect virtual workloads, a user may configure recovery managers 126, 130 with a set of replicated datastores that are critical for their business operations. Recovery manager 126 may discover these replicated datastores from storage system 146 and make the datastores available for disaster recovery protection. In every pair of replicated datastores, one datastore is the replication source and the other is the replication target. Data written to the source datastore is replicated to the target datastore on a schedule controlled by replication manager 158.

In operation, while protected VMs 134 are operating, recovery VMs 136 are not operating, and datastores 150 are being replicated to datastores 152. In case of disaster recovery, initially none of VMS 134 and 136 are operating. Recovery managers 126, 130 can begin a disaster recovery workflow that makes datastores 152 available in order to bring online VMs 136, effectively failing over VMs 134 to VMs 136. After the disaster recovery workflow is complete, VMs 136 are operating in place of VMs 134. The same process may work in reverse for failback of recovery VMs 136 to protected VMs 134.

As described above, distributed computing system 104 may be configured as a cloud-based system that includes multiple geographically disparate (or non-disparate) computing systems. In general, the multiple computing systems of distributed computing system 104 provide a common platform for managing and executing virtual workloads. In various embodiments, distributed computing system 104, including secondary data center 106 and access points 108 may be operated by a single organization while primary data center 102 is operated by a different organization. In other embodiments, both distributed computing system 104 and primary data center 102 are operated by the same organization.

Distributed computing system 104, configured as a cloud-based system, may provide one or more cloud computing environments, upon request by a requestor of computing resources. Cloud computing environments comprise one or more virtual machines, allocated for the cloud computing environment and configured to work together to perform one or more tasks associated with the cloud computing environment. Distributed computing system 104 may host more than one cloud computing environment at a time, and each may be associated with different tasks and/or different requestors of cloud computing environments.

Once a cloud computing environment is allocated, a requestor of computing resources may then utilize the cloud computing environment to perform tasks. Distributed computing system 104 executes those tasks by configuring one or more VMs allocated to the cloud computing environment to perform work associated with those tasks.

The VMs allocated for any particular task may be configured as specifically requested by the requestor of computing resources. More specifically, the requester may request allocation of specific VM configurations, which include pre-installed guest operating systems, applications, and data.

As described above, primary data center 102 may couple to distributed computing system 104, which may be a cloud-based computer system, via access point 108. Additionally, distributed computing system 104 may include secondary data center 106, which may, therefore, include one or more virtual machines included in distributed computing system 104. Secondary data center 106 may be outside of distributed computing system 104 or may be within distributed computing system 104.

A recovery plan is a set of rules and/or timings that determines when a replication task to copy the operational data 112 to the secondary data center 102 should be performed. The recovery plan may dictate, for example, that a replication task should be performed periodically—that is— every X amount of time. The recovery plan may alternatively dictate that a replication task should be performed whenever operational data 112 stored at primary data center 102 differs from operational data copy 114 by a certain amount of data (thus, in the worst case, only an amount of data equal to that certain amount of data would be lost).

Access point 108 is a computing system or electronic device that is included within distributed computing system 104. For example, access point 108 may comprise a computer system similar to hosts 138, 142 described above with respect to FIG. 1B, in that access point 108 configures and executes virtual machines to perform tasks upon request. Access point 108 may be "included within" distributed computing system 104 in the sense that the access point 108 contributes to the "commonality" of allocation of VMs for tasks requested to be performed by distributed computing system 104. In other words, access point 108 may be configured to execute tasks on VMs within access point 108 in conjunction with VMs executing on other computer systems in order to perform a particular overarching requested task.

Figure 2:
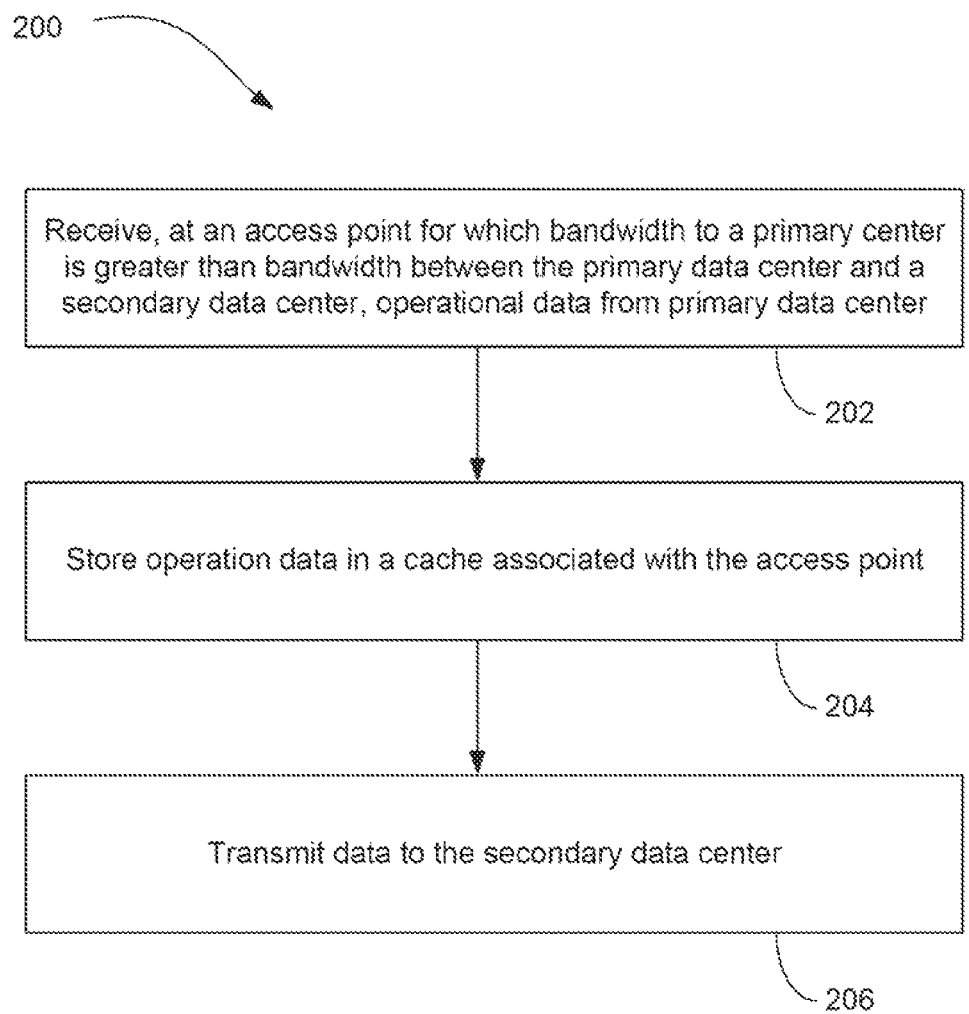
FIG. 2 is a flow diagram of a method for transmitting operational data to a secondary data center via a cache in a distributed computing system, according to one embodiment.

FIG. 2 is a flow diagram of a method 200 for transmitting operational data 112 to a secondary data center 106 via a cache 110 in as distributed computing system 104, according to one embodiment. The method 200 begins at step 202. At step 202, an access point 108 within distributed computing system 104 receives operational data 112 from a primary data center 102. As described above, operational data 112 generally comprises data that would allow execution of primary data center 102 to resume at secondary data center 106 should an event occur that hinders the ability of primary data center 102 to operate. Such data generally includes state information for the processors (including VMs if present) operating at primary data center 102, data stored in memory and caches, and various data stored in non-volatile storage and associated with applications executed by primary data center 102.

Access point 108 may have better bandwidth characteristics with respect to primary data center 102 as compared with the bandwidth characteristics between primary data center 102 and secondary data center 106. The "bandwidth characteristics" generally refers to bandwidth between two computing systems. Bandwidth characteristics may alternatively or additionally include latency. A higher bandwidth, of course, means that more data may be copied in any given period of time. By choosing an access point 108 with better bandwidth characteristics than the bandwidth between primary data center 102 and secondary data center 106, the rate at which data may be backed-up from primary data center 102 may be increased. Due to the existence of the cache and to the scalable nature of distributed computing system 104, access point 108 can copy data stored in cache 110 "at leisure" to secondary data center 106.

At step 204, after access point 108 receives the data, access point 108 stores the data in a cache 110. As explained above, cache 110 may be "local" to access point 108 so that data received by access point 108 may quickly be transmitted to cache 110. The term "local" generally refers to being physically adjacent to, or near, access point 108. For example, a local cache 110 may be within the same room or building as access point 108. Alternatively, cache 110 need not be local to access point 108, but may nevertheless be included in a computer system that has fast access to access point 108 so that data received from primary data center 102 may be copied quickly to cache 110.

At step 204, access point 108 transmits the data stored in cache 110 to secondary data center 106 for storage. This transmission may occur opportunistically and/or without regard to the schedule with which primary data center 102 performs replication tasks. This transmission from access point 108 to secondary data center 106 may also occur while other data is being transmitted from primary data center 102 to access point 108, in parallel.

Figure 3:
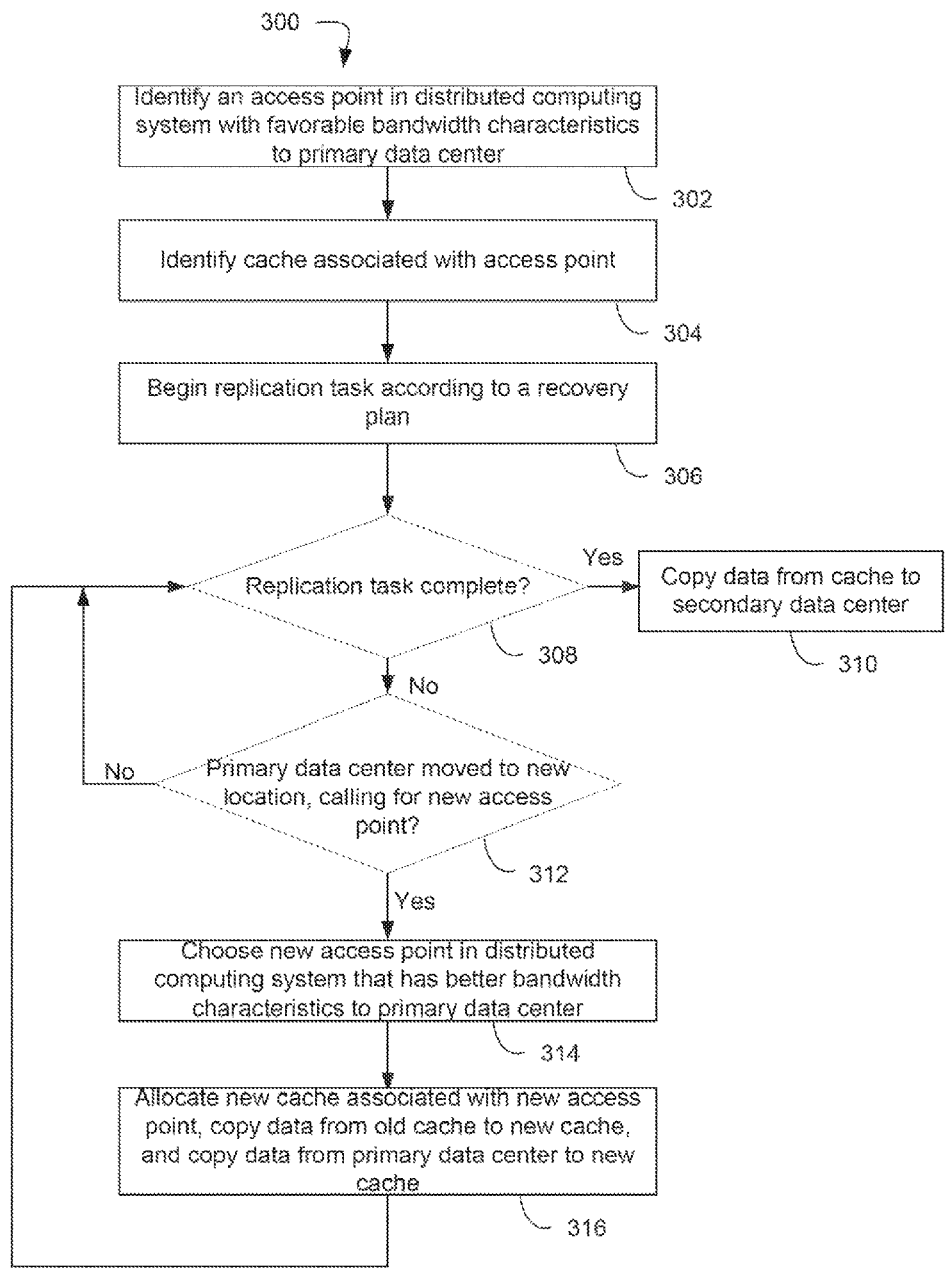
FIG. 3 is a flow diagram of a method for transmitting operational data to a secondary data center via a cache in a distributed computing system, according to another embodiment.

FIG. 3 is a flow diagram of a method 300 for transmitting operational data 112 to a secondary data center 106 via a cache 110 in a distributed computing system 104, according to another embodiment. The method 300 begins at step 302. At step 302, a location-aware agent 124 identifies an access point 108 to receive the operational data 112 for copy from primary data center 102. In general, location-aware agent 124 identifies access point 108 based on the ability of that access point 108 to improve the ability to transmit operational data 112 from primary data center 102 to secondary data center 106. For example, access point 108 may be chosen based on bandwidth between primary data center 102 and access point 108 and/or geographic location of access point 108 compared with primary data center 102. Specifically, access point 108 may be chosen based on geographically proximity to primary data center 102. In one embodiment, "geographically near" means that the chosen access point 108 is the closest, or one out of a certain number of closest access points of distributed computing system 104 to primary data center 102. This geographic proximity is correlated to bandwidth between primary data center 102 and the chosen access point 108 being generally greater than the bandwidth between primary data center 102 and secondary data center 106. Alternatively, access point 108 may simply be chosen directly based on the bandwidth between primary data center 102 and the chosen access point 108, as opposed to "indirectly," via the geographic proximity.

At step 304, primary data center 102 identifies a cache 110 to store operational data 112 received from primary data center 102. Cache 110 may be a cache that is local to the chosen access point 108—i.e., physically adjacent to or within the same facility as the chosen access point 108—or may be storage that has good latency and bandwidth characteristics to the chosen access point 108. If cache 110 is not initialized, then access point 110 initializes cache 110.

At step 306, primary data center 102 begins the replication task according to a recovery plan. At step 308, primary data center 102 determines whether the replication task is complete. If, at step 308, the replication task is complete, then the method proceeds to step 310, in which cache 110 copies the data for the completed replication task to secondary data center 106. It should be noted that while the data for the completed replication task is being copied to secondary data center 106, data for a subsequent replication task may be copied to cache 110 from primary data center 102.

At step 312, primary data center 102 determines whether, during the replication task, primary data center 102 moved to a new geographic location, which might cause the characteristics of the connection between primary data center 102 and access point 108 to change, thus calling for a new access point. It primary data center 102 did not move to a new geographic location that would cause a new access point to be selected, then the method returns to step 308. If, on the other hand, primary data center 102 did move to a new geographic location for which a new access point is called, then the method proceeds to step 314. In step 314, primary data center 102 chooses a new access point in distributed computing system 104 that has better bandwidth characteristics to the now moved primary data center 102 than the previous access point did 108. At step 316, because the old cache 110 was chosen based on the location and/or other bandwidth characteristics of the old access point 108, the newly chosen access point 108 allocates a new cache 110 that may be local to the newly chosen access point 108 or may otherwise be coupled to that access point 108. At step 316, the newly chosen access point 108 copies the data from the old cache 110 to the new cache 110. Additionally, primary data center 102 is set to copy operational data 112 to the newly chosen cache 110, and continues performing the replication task under this new condition. After step 316, the method returns to step 308.

Although some steps are described above as being performed by a particular actor such as primary data center 102, any such steps may alternatively be performed by a component of distributed computer network 104, such as access point 110, where technically feasible. For example, although step 304 is described as being performed by primary data center 102, step 304 may instead be performed by an element of distributed computing system 104, such as access point 108 or another element. Additionally, although step 308 is described as being performed by primary data center 102, access point 108 or another element may instead perform step 308. In general, steps described as being performed by primary data center 102 may instead be performed by an element of distributed computing system 104, where technically feasible. Further, although the caching technique described above is described as used to copy operational data 112 from a primary data center 102 to a secondary data center 106, alternatively, the caching technique could be used to copy backup data from a first storage to a second storage. This backup data could be any type of backup data, instead of data that is specifically used as operational data 112 for a data center, as described above.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for copying first data stored at a primary data center to a secondary data center, the method comprising:
    initiating a first replication task to copy the first data from the primary data center to the secondary data center;
    receiving a first portion of the first data from the primary data center via a first access point, wherein a first bandwidth between the primary data center and the first access point is greater than a second bandwidth between the primary data center and the secondary data center;
    storing the first portion of data in a first cache associated with the first access point;
    transmitting the first portion of data from the first cache to the secondary data centers;
    determining that a geographical location of the primary data center has changed; and
    in response to determining that the geographical location has changed, selecting a second access point to receive data from the primary data center, wherein a third bandwidth between the second access point and the primary center is greater than the second bandwidth.

2. The method of claim 1, further comprising:
    determining that the first replication task is not complete; and
    waiting to receive a second portion of the first data from the primary data center before transmitting the first portion of data from the first cache to the secondary data center.

3. The method of claim 2, wherein
    determining that a geographical location of the primary data center has changed comprises determining that a geographical location of the primary data center has changed while the first replication task is not complete.

4. The method of claim 3, further comprising:
    waiting to receive a second portion of the first data from the primary data center via the second access point after determining that the geographical location of the primary data center has changed.

5. The method of claim 3, further comprising:
    copying contents of the first cache to a second cache associated with the second access point.

6. The method of claim 1, wherein:
the first replication task includes a request to copy all data of the first data stored at the primary data center to the secondary data center; and
transmitting the first portion of data to the secondary data center comprises transmitting the first portion of data to the secondary data center after storing all data of the first data in the first cache.

7. The method of claim 1, further comprising:
detecting a request for a second replication task for replicating second data stored at the primary data center;
receiving the second data; and
storing the second data in the first cache while transmitting the first portion of data from the first cache to the secondary data center.

8. The method of claim 1, wherein the first data comprises recovery data or backup data for the primary data center.

9. The method of claim 1, further comprising:
receiving a first portion of second data for a second replication task while transmitting the first portion of data from the first cache to the secondary data center.

10. A system for replicating first data, the system comprising:
a first access point configured to:
initiate a first replication task to copy the first data from a primary data center to a secondary data center;
receive a first portion of the first data from the primary data center,
store the first portion of data in a first cache associated with the first access point; and
transmit the first portion of data from the first cache to the secondary data center,
wherein a first bandwidth between the primary data center and the first access point is greater than a second bandwidth between the primary data center and the secondary data center; and
a location-aware agent configured to:
determine that a geographical location of the primary data center has changed; and
in response to determining that the geographical location has changed, select a second access point to receive data from the primary data center, wherein a third bandwidth between the second access point and the primary center is greater than the second bandwidth.

11. The system of claim 10, wherein the first access point is further configured to:
determine that the first replication task is not complete; and
waiting to receive a second portion of the first data from the primary data center before transmitting the first portion of data from the first cache to the secondary data center.

12. The system of claim 11, wherein
the location-aware agent is configured to:
determine that a geographical location of the primary data center has changed while the first replication task is not complete.

13. The system of claim 12, further comprising:
the second access point, configured to:
wait to receive a second portion of the first data from the primary data center via the second access point after being selected to receive data from the primary data center.

14. The system of claim 12, wherein the first access point is configured to:
copy contents of the first cache to a second cache associated with the second access point.

15. The system of claim 10, wherein:
the first replication task includes a request to copy all data of the first data stored at the primary data center to the secondary data center; and
transmitting the first portion of data to the secondary data center comprises transmitting the first portion of data to the secondary data center after storing all data of the first data in the first cache.

16. The system of claim 10, wherein the first access point is further configured to:
detect a request for a second replication task for replicating second data stored at the primary data center;
receive the second data; and
store the second data in the first cache while transmitting the first portion of data from the first cache to the secondary data center.

17. The system of claim 10, wherein the first data comprises recovery data or backup data for the primary data center.

18. The system of claim 10, wherein the first access point is further configured to:
receive a first portion of second data for a second replication task while transmitting the first portion of data from the first cache to the secondary data center.

19. A non-transitory computer-readable medium storing instructions that, when executed by a processor, cause the processor to execute a method for copying first data stored at a primary data center to a secondary data center, the method comprising:
initiating a first replication task to copy the first data from the primary data center to the secondary data center;
receiving a first portion of the first data from the primary data center via a first access point, wherein a first bandwidth between the primary data center and the first access point is greater than a second bandwidth between the primary data center and the secondary data center;
storing the first portion of data in a first cache associated with the first access point;
transmitting the first portion of data from the first cache to the secondary data centers;
determining that a geographical location of the primary data center has changed; and
in response to determining that the geographical location has changed, selecting a second access point to receive data from the primary data center, wherein a third bandwidth between the second access point and the primary center is greater than the second bandwidth.

20. The non-transitory computer-readable medium of claim 19, wherein the method further comprises:
determining that the first replication task is not complete; and
waiting to receive a second portion of the first data from the primary data center before transmitting the first portion of data from the first cache to the secondary data center.

* * * * *